(12) United States Patent
Inoue et al.

(10) Patent No.: US 9,004,568 B2
(45) Date of Patent: Apr. 14, 2015

(54) COWLING FASTENING STRUCTURE

(75) Inventors: Yusuke Inoue, Saitama (JP); Yotaro Abe, Saitama (JP); Hajime Naoi, Tochigi (JP)

(73) Assignees: Honda Motor Co., Ltd., Tokyo (JP); Nifco Inc., Kanagawa (JP)

( * ) Notice: Subject to any disclaimer, the term of this patent is extended or adjusted under 35 U.S.C. 154(b) by 0 days.

(21) Appl. No.: 14/119,238

(22) PCT Filed: May 17, 2012

(86) PCT No.: PCT/JP2012/003219
§ 371 (c)(1),
(2), (4) Date: Nov. 26, 2013

(87) PCT Pub. No.: WO2012/164852
PCT Pub. Date: Dec. 6, 2012

(65) Prior Publication Data
US 2014/0091597 A1    Apr. 3, 2014

(30) Foreign Application Priority Data

May 27, 2011  (JP) .................................. 2011-119127

(51) Int. Cl.
*B62J 17/00*    (2006.01)
*F16B 5/06*    (2006.01)
*B62D 25/08*    (2006.01)

(52) U.S. Cl.
CPC ............... *B62D 25/081* (2013.01); *B62J 17/00* (2013.01); *F16B 5/0664* (2013.01)

(58) Field of Classification Search
CPC .......... F16B 2/18; F16B 2/185; F16B 5/0657; F16B 5/0664; B60J 17/02; B60J 17/00
USPC ................. 296/29, 1.08, 78.1; 403/316, 319; 24/453
See application file for complete search history.

(56) References Cited

U.S. PATENT DOCUMENTS

| | | | |
|---|---|---|---|
| 4,466,754 A * | 8/1984 | Poitier ............................ | 403/11 |
| 6,499,783 B1 * | 12/2002 | Husted ....................... | 296/24.31 |
| 6,729,793 B2 * | 5/2004 | Cordebar ..................... | 403/316 |
| 7,287,800 B2 | 10/2007 | Massepp | |
| 2003/0070390 A1 * | 4/2003 | Dunn ........................... | 52/716.7 |
| 2009/0302645 A1 * | 12/2009 | Egging et al. ................ | 296/198 |
| 2012/0227219 A1 * | 9/2012 | Kabeya et al. ................ | 24/453 |
| 2013/0199001 A1 * | 8/2013 | Jagoda ........................... | 24/453 |
| 2013/0283575 A1 * | 10/2013 | Tanabe et al. ................. | 24/453 |

FOREIGN PATENT DOCUMENTS

| JP | S54-88478 U | 6/1979 |
|---|---|---|
| JP | S62-47486 U | 3/1987 |
| JP | 4484926 B2 | 6/2010 |

* cited by examiner

*Primary Examiner* — Jason S Morrow
(74) *Attorney, Agent, or Firm* — Carrier Blackman & Associates, P.C.; Joseph P. Carrier; William D. Blackman (57) ABSTRACT

In a cowling fastening structure (1) for fastening a first cowling member (2) and a second cowling member (3) to each other by using a clip (30), the two cowling members are provided with opposing walls (13, 21) having a mutually aligned through holes (15, 26) formed therein, the clip is provided with a first member (31) and a second member (32) joined by a hinge (33). A free end of the first member formed with an engagement hole (39) is passed through the through holes, and a free end of the second member formed with an engagement claw (44) is passed around the opposing walls so as to engage the engagement claw with the engagement hole.

10 Claims, 9 Drawing Sheets

COWLING FASTENING STRUCTURE

TECHNICAL FIELD

The present invention relates to a cowling fastening structure for fastening together two cowling members by using a clip, and in particular to a technology for joining together two cowling members (fairing members) for motorcycles.

BACKGROUND ART

A cowling of a motorcycle is often formed by combining a plurality of cowling members having different properties such as material so that a single cowling may consist of different parts having different colors and/or made of different materials. Screw fasteners and bonding agents are most commonly used for joining together different cowling members. It has also been proposed to form a cowling fastening structure in which a first trim part and a second trim part project from two cowling members, respectively, and with the first and second trim parts engaged (form-fitted) with each other, the two trim parts are clamped by a U-shaped clip (clamp) having a pair of clamping pieces. See Patent Document 1.

PRIOR ART DOCUMENT(S)

Patent Document(s)

Patent Document 1: JP4484926

SUMMARY OF THE INVENTION

Task to be Achieved

According to the cowling fastening structure proposed in Patent Document 1, the structural strength of the cowling fastening structure is somewhat limited because the clamping force of the clip is dictated by the structural strength of the clamping pieces and the restoring force thereof. The structural strength of the cowling fastening structure may be increased by increasing the stiffness of the clip, but it makes the fastening work using the clip more difficult.

The present invention was made in view of such problems of the prior art, and has a primary object to increase the structural strength of a cowling fastening structure for joining two cowling members to each other while facilitating the fastening work.

To achieve such an object, the present invention provides a cowling fastening structure for fastening a first cowing member (2) and a second cowling member (3) to each other by using a clip (30), comprising: a first cowling member (2) having a first wall (13) projecting therefrom, the first wall being formed with a first through hole (15); a second cowling member (3) having a second wall (21) projecting from an edge (6) of the second cowling member, the second wall being formed with a second through hole (26); and a clip including a first member (31) and a second member (32) having base ends (35, 41) rotatably connected to each other via a hinge (33), a free end (37) of one of the first and second members being formed with an engagement hole (39), and a free end (43) of the other of the first and second members being formed with an engagement claw (44) configured to engage the engagement hole; wherein the first and second walls are configured to be disposed opposite to each other so that the first and second through holes oppose each other; and wherein the free end of the first member is configured to be passed through the first and second through holes, and the second member is configured to be passed around the first and second walls until the free ends of the first and second members come toward each other and the engagement claw is engaged by the engagement hole.

According to this structure, because the first member is passed through the first and second through holes, the radial displacement between the first and second through holes can be prevented unless the first member is ruptured so that the structural strength of the cowling fastening structure can be improved.

According to another aspect of the present invention, the engagement hole is formed in the first member as a through hole having an axial line perpendicular to an inserting direction of the first member into the first and second through holes, and the engagement claw is formed in the second member, the engagement claw being configured to be passed through the engagement hole and provided with a barbed portion configured to be engaged by an edge of the engagement hole.

According to this structure, because the engagement hole (through hole) is provided with an axial line perpendicular to the direction of inserting the first member into the first and second through holes, and is passed through by the engagement claw, the first member is prevented from being dislodged from the first and second through holes unless the engagement claw is ruptured so that the structural strength of the cowling fastening structure can be improved.

According to yet another aspect of the present invention, the second wall comprises a second wall base portion (21) projecting from an edge of the second cowling member so as to oppose a surface of the first wall, a second wall middle portion (22) projecting perpendicularly from the second wall base portion so as to extend from a projecting end of the second wall base portion and straddle over a projecting end of the first wall and a second wall free end portion (23) projecting perpendicularly from the second wall middle portion so as to oppose a back side of the first wall, and the second through hole is formed in parts of the second wall base portion and the second wall free end portion corresponding to the first through hole.

According to this structure, because the second wall can be engaged by the first wall, a relative displacement between the first and second walls is restricted to such an extent that the insertion of the clip into the first and second through holes is facilitated.

According to yet another aspect of the present invention, the second through hole formed in the second wall base portion and the second through hole formed in the second wall free end portion are connected to each other via a connecting hole (27) extending across the second wall base portion, the second wall middle portion and the second wall free end portion, and a part of the second member is received in the connecting hole when the engagement claw is engaged by the engagement hole.

According to this structure, because a part of the second member can be received in the connecting hole, the cowling fastening structure can be made compact.

According to yet another aspect of the present invention, the first member is provided with a limiting wall (40) that limits an extent of inserting the first member into the first and second through holes by abutting the second wall base portion, and the free end of the second member is formed with a sheet spring piece (47) for engaging the second wall free end portion and resiliently urging the first member in a direction to be inserted into the first and second through holes.

According to this structure, the play between the clip and the second wall can be minimized.

According to yet another aspect of the present invention, the first cowling member is provided with a guide wall (14) projecting therefrom that is in sliding engagement with the second wall free end portion to restrict a position of the second wall free end portion with respect to the first wall.

According to this structure, the guide wall restricts a relative displacement between the first and second walls to such an extent that the insertion of the clip into the first and second through holes is facilitated.

Effect Of The Invention

According to these structures of the present invention, in a cowling fastening structure for fastening two cowling members to each other by using a clip, the structural strength is increased and the fastening work is facilitated.

BRIEF DESCRIPTION OF THE DRAWINGS

Now the present invention is described in the following with reference to the appended drawings, in which.

DETAILED DESCRIPTION OF THE PREFERRED EMBODIMENT(S)

An embodiment of the present invention applied to a cowling of a motorcycle is described in the following with reference to the appended drawings. The cowling fastening structure 1 of this embodiment is suitable for use in joining a first cowing member 2 and a second cowling member 3 to each other, and the orientations mentioned in the following description are based on the coordinate system given in each drawing.

Figure 1:
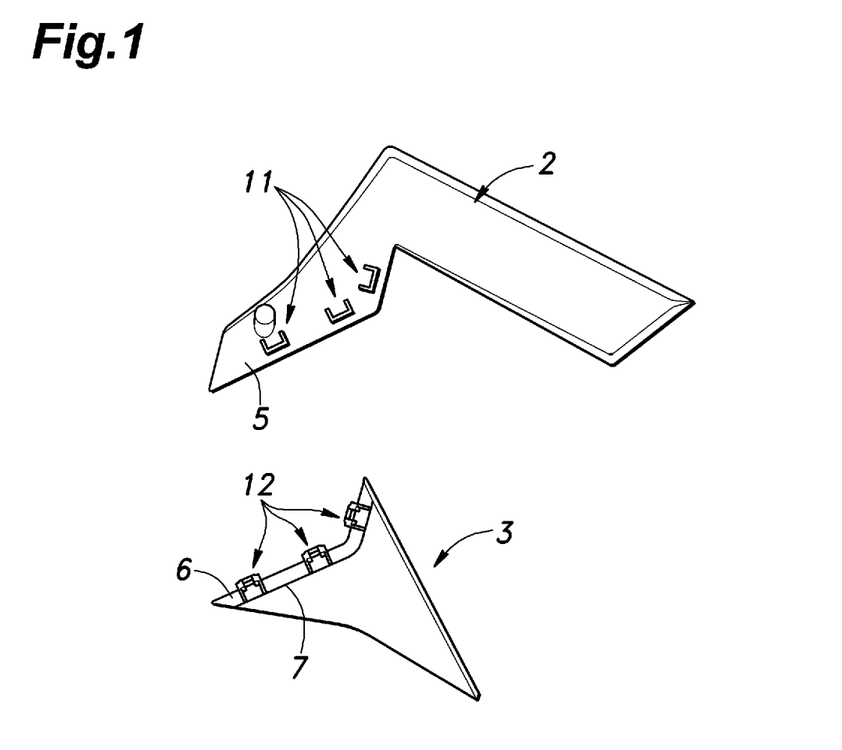
FIG. 1 is an exploded rear view of a first cowling member and a second cowling member in a preferred embodiment of the present invention.
Figure 2:
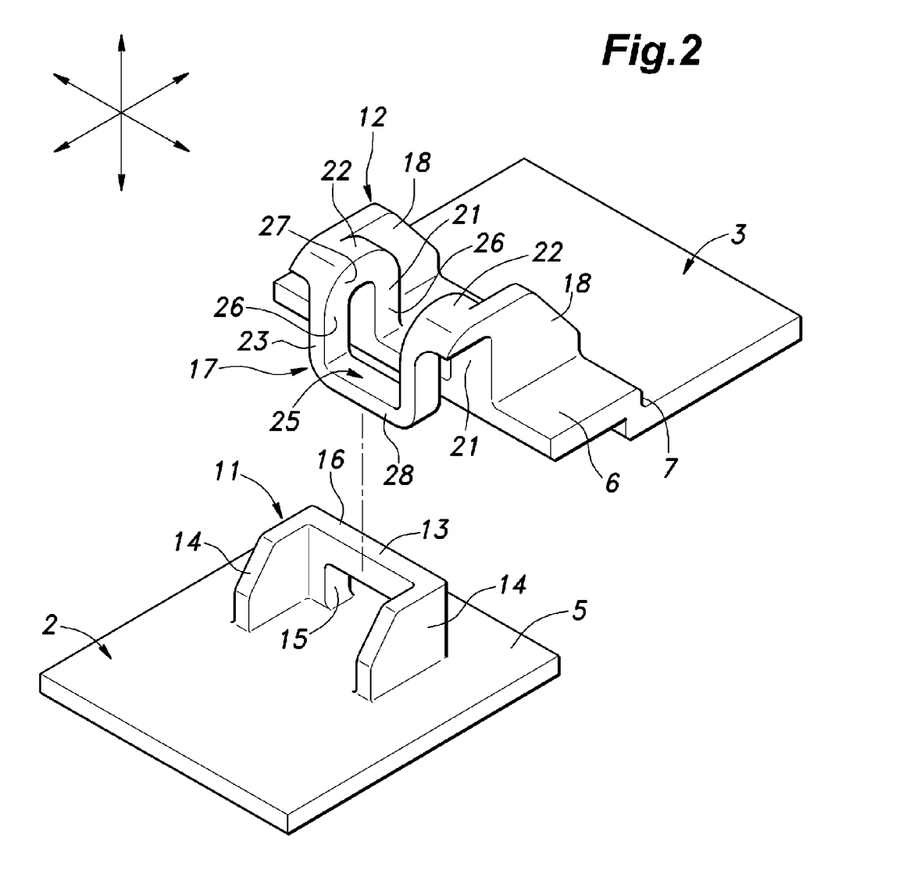
FIG. 2 is an exploded perspective view of the first and second cowling members of the embodiment.

FIG. 1 is a side view of the first and second cowling members 2 and 3 for covering a front end of a motorcycle as seen from the back side thereof or from the inboard side. The first and second cowling members 2 and 3 each consist of an injection molded plastic member formed as a plate member. The first and second cowling members 2 and 3 may consist of different materials and/or have different colors. Opposing edges 5 and 6 of the first and second cowling members 2 and 3 are given with thickness-wise complementary configurations so as to be laid over one another. More specifically, as shown in FIG. 2, the edge 6 of the second cowling member 3 is offset toward the back side thereof with respect to the remaining part of the second cowling member 3 so as to define a step 7 along the edge 6. When the first and second cowling members 2 and 3 are joined to each other, the edge 6 of the second cowling member 3 is laid over the back side of the edge 5 of the first cowling member 2 so that the front sides of the first and second cowling members 2 and 3 jointly define a flush surface.

As shown in FIG. 1, a plurality (three, in the illustrated embodiment) of first fastening features 11 are provided on parts of the back side of the first cowling member 2 somewhat inwardly withdrawn from the edge 5 thereof. A plurality (three, in the illustrated embodiment) of second fastening features 12 are provided in parts of the second cowling member 3 corresponding to the first fastening features 11 (when joining the two cowling members to each other) along the back side of the edge 6 of the second cowling member 3.

As shown in FIG. 2, each first fastening feature 11 includes a first wall 13 projecting substantially vertically from the back side of the first cowling member 2 and extending laterally along the edge 5, and a pair of guide walls 14 extending forward from either side edge of the first wall 13 perpendicularly to the first wall 13 so as to define a rectangular C-shape in plan view. A lower part of the first wall 13 is formed with a substantially rectangular first through hole 15. In other words, the first through hole 15 is formed between a first beam 16 extending laterally between the two guide walls 14 and the back side of the first cowling member 2.

The second fastening feature 12 includes a hook 17 projecting from the edge 6 and a pair of reinforcing walls 18 extending from either lateral side of the hook 17 in a rearward direction. The hook 17 includes a second wall base portion 21 extending laterally along the edge 6 and perpendicularly upward from the edge 6, a second wall middle portion 22 extending from an upper end of the second wall base portion 21 perpendicularly thereto and outward (forward) beyond the edge 6, and a second wall free end portion 23 extending vertically downward from a projecting end (front end) of the second wall middle portion 22 and opposing the second wall base portion 21 in a mutually parallel relationship. In other words, the hook 17 is provided with a shape of inverted letter-U having an open end facing downward, and is connected to the edge 6 at one end thereof. A continuous elongated opening 25 is passed through laterally central parts of the second wall base portion 21, the second wall middle portion 22 and the second wall free end portion 23. The opening 25 consists of two second through holes 26 and 26 passed through the second wall base portion 21 and the second wall free end portion 23, respectively, in the fore and aft direction and an elongated connecting hole 27 passed through the second wall base portion 21, the second wall middle portion 22 and the second wall free end portion 23 in the thickness-wise direction of each of these wall portions so that the two second through holes 26 and 26 are connected to each other by the connecting hole 27. The opening 25 separates each of the second wall base portion 21, the second wall middle portion 22 and the second wall free end portion 23 into a right hand side part and a left hand side part so that a laterally extending second beam 28 is defined in the projecting end of the second wall free end portion 23.

Figure 3:
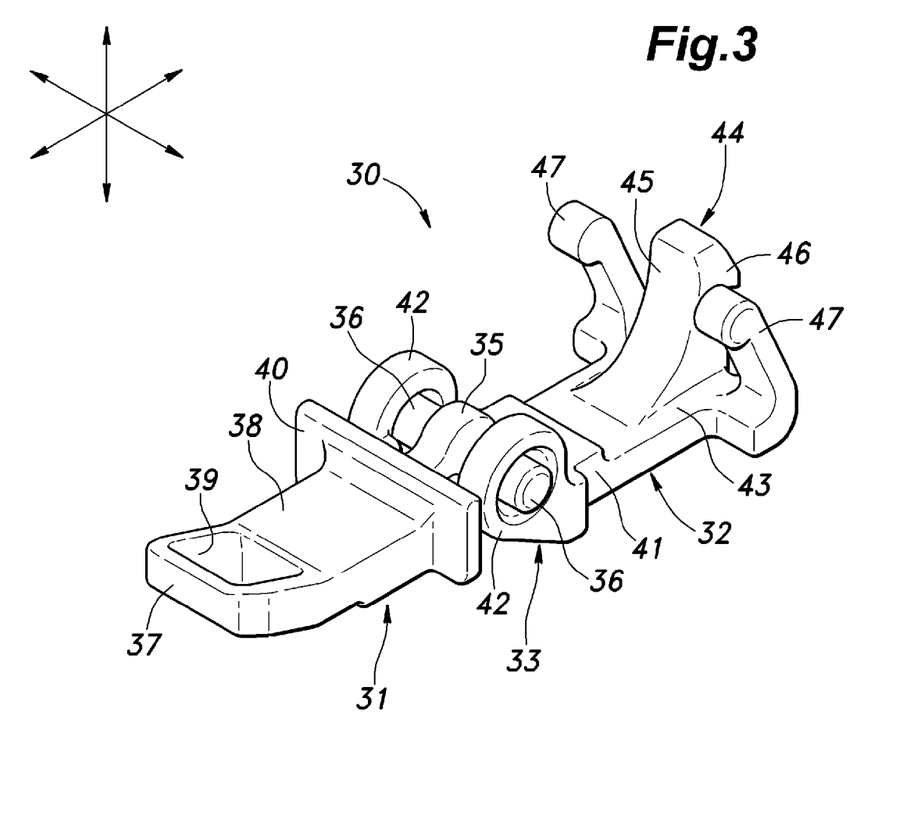
FIG. 3 is a perspective view of a clip of the embodiment.

FIG. 3 shows a clip 30 for fastening the first and second fastening features 11 and 12 to each other. As shown in FIG. 3, the clip 30 is made of an injection molded plastic member, and comprises a first member 31 and a second member 32 which are connected to each other via a hinge 33 in a mutually rotatable manner.

The first member 31 extends in a fore and aft direction, and has a base end (rear end) 35 having a relatively narrow width. The base end 35 is formed with a pair of hinge pins 36 extending laterally in either direction therefrom. The hinge pins 36 are provided with a cylindrical shape, and are disposed in a mutually coaxial relationship. A free end (forward end) 37 and a middle portion 38 of the first member 31 are each formed as a rectangular plate defining a vertically facing major plane. The free end 37 is formed with an engagement hole 39 extending vertically through the free end 37. A limiting wall 40 extending laterally and vertically upward is formed at the rear end of the middle portion 38 or at a boundary between the middle portion 38 and the base end 35.

The second member 32 is described in the following with respect to the state thereof illustrated in FIG. 3. The second member 32 extends in a fore and aft direction, and is provided with a pair of bearing portions 42 rotatably supporting the hinge pins 36, respectively, at a base end 41 thereof. Thereby, the second member 32 is rotatably connected to the first member 31 via the hinge 33 formed by the two hinge pins 36 and the two bearing portions 42. The bearing portions 42 are connected to the base end 41 at an outer circumferential part thereof such that the center of the bearing portions 42 is offset from the extension line of the second member 32. As a result, when the free end 37 of the first member 31 and the free end 43 of the second member 32 are brought toward each other, a gap is defined between the middle portion 38 of the first member 31 and the second member 32 so that the first member 31 and the second member 32 can jointly form a ring (annular) configuration.

The free end 43 of the second member 32 is laterally extended, and is laterally centrally formed with an engagement claw 44 projecting perpendicularly (upward in the drawing) to the extending direction of the second member 32. The engagement claw 44 comprises a cantilever piece 45 having a resiliency and projecting upward from the free end 43, and a barbed portion 46 having a barb surface facing the base end of the cantilever piece 45 (downward). The part of the free end 43 from which the engagement claw 44 projects is provided with a pair of sheet spring pieces 47 each having a resiliency and projecting obliquely both toward a direction perpendicular to the extending direction of the second member 32 and toward the base end 41 (forward). Each sheet spring piece 47 is laterally spaced from the engagement claw 44.

By turning the first member 31 relative to the second member 32, the engagement claw 44 is passed into the engagement hole 39. At this time, the cantilever piece 45 of the engagement claw 44 deflects so that the barbed portion 46 is engaged by an edge of the engagement hole 39 after passing through the engagement hole 39. As a result, the first member 31 and the second member 32 jointly form a ring. At this time, the sheet spring pieces 47 are located laterally outward from the free end 37 of the first member 31.

The cowling fastening structure 1 formed by connecting the first cowling member 2 with the second cowling member 3 and the fastening process thereof are described in the following with reference to FIGS. 4 to 9. This fastening process essentially consists of a first step for temporarily engaging the first fastening feature 11 with the second fastening feature 12, and a second step for completing the cowling fastening structure 1 by combining the clip 30 with the temporarily engaged structure.

Figure 4:
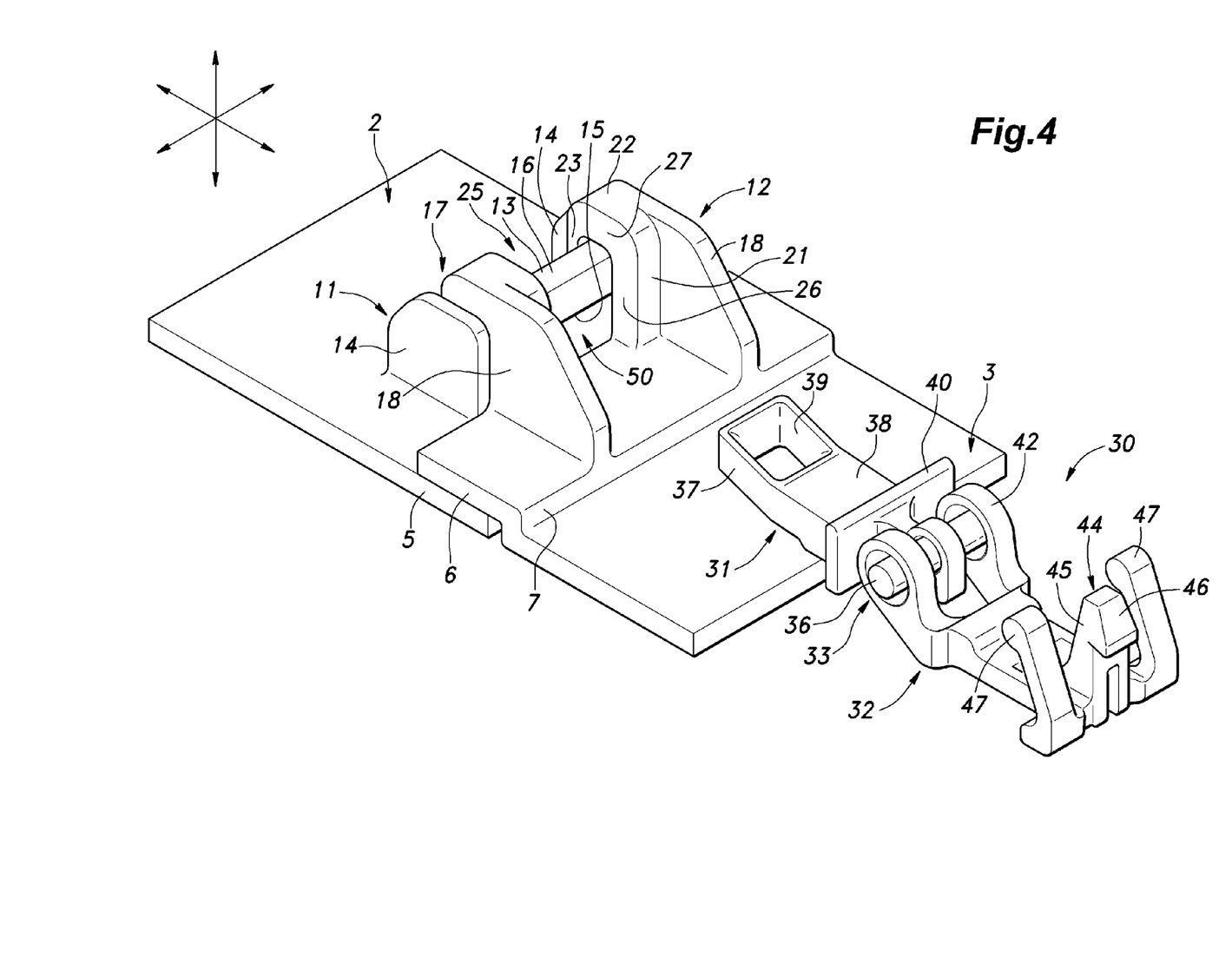
FIG. 4 is a perspective view of a temporarily engaged structure which is an intermediate step of the cowling fastening structure.

In the first step of the fastening procedure, the temporarily engaged structure is formed by engaging the hook 17 of the second fastening feature 12 with the first wall 13 of the first fastening feature 11. When engaging the hook 17 with the first wall 13, the second wall free end portion 23 of the hook 17 is guided by the sliding of the lateral end surfaces of the second wall free end portion 23 with the corresponding guide walls 14 until the hook 17 reaches a prescribed position with respect to the first wall 13. As a result, the edge 6 of the second cowling member 3 is laid over the back side of the edge 5 of the first cowling member 2.

In order to control the lateral play between the first and second cowling members 2 and 3, the distance between the two guide walls 14 and the lateral width of the second wall free end portion 23 are determined such that the second wall free end portion 23 may fit into the gap between the two guide walls 14 substantially without any play. Also, the fore and aft length of the second wall middle portion 22 and the fore and aft thickness of the first wall 13 are determined such that the fore and aft play between the first and second cowling members 2 and 3 can be minimized.

In the temporarily engaged structure, the second through hole 26 of the second wall base portion 21, the first through hole 15 of the first wall 13 and the second through hole 26 of the second wall free end portion 23 are aligned with one another so that a single insertion hole 50 is passed through the hook 17 and the first wall 13 as seen in the fore and aft direction. In other words, the first beam 16 is placed in the opening 25 of the hook 17 such that the opening 25 is delimited by the first beam 16, and the single insertion hole 50 is passed through the hook 17 and the first wall 13 in the fore and aft direction.

Figure 5:
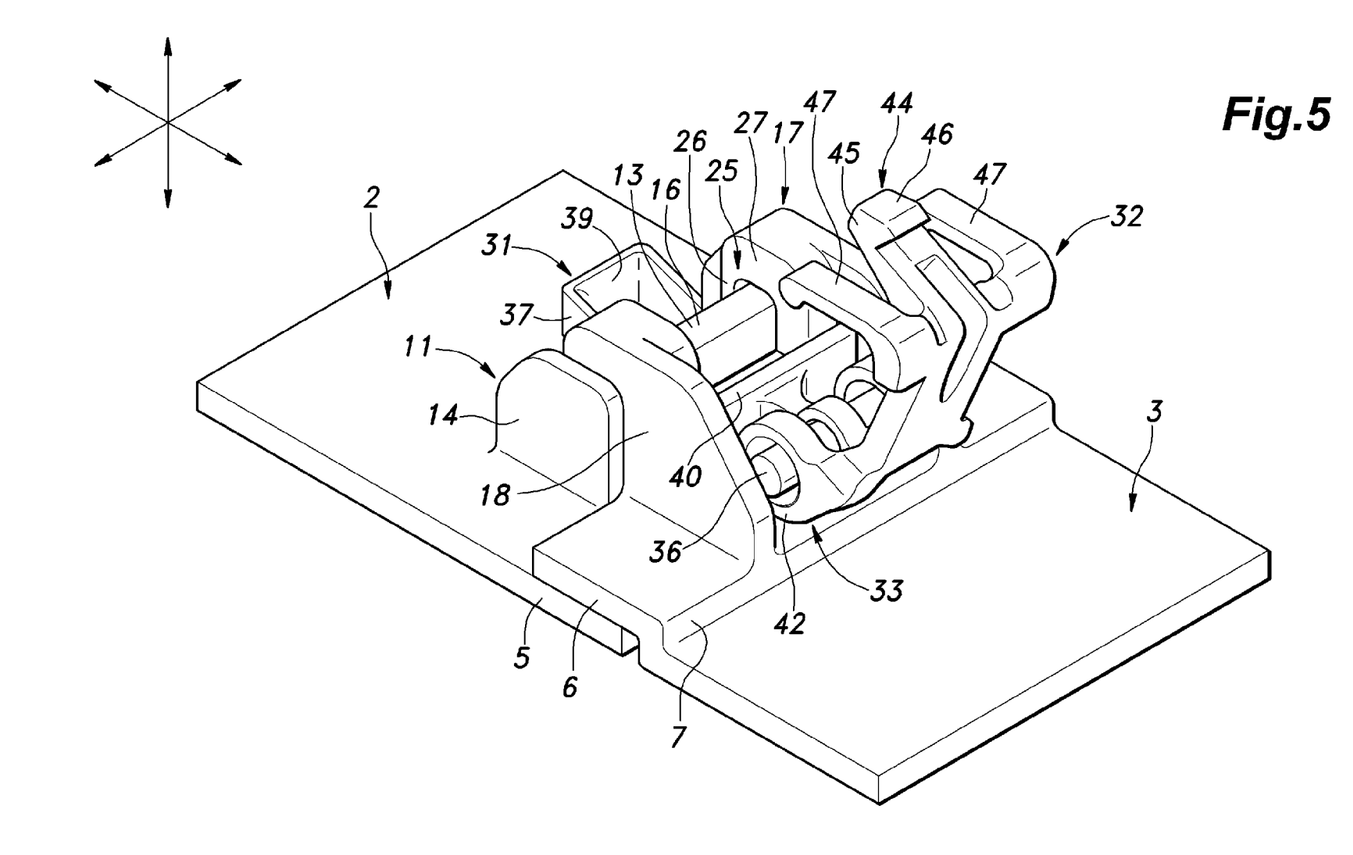
FIG. 5 is a perspective view of a transitional state from the temporarily engaged structure to the final cowling fastening structure.
Figure 6:
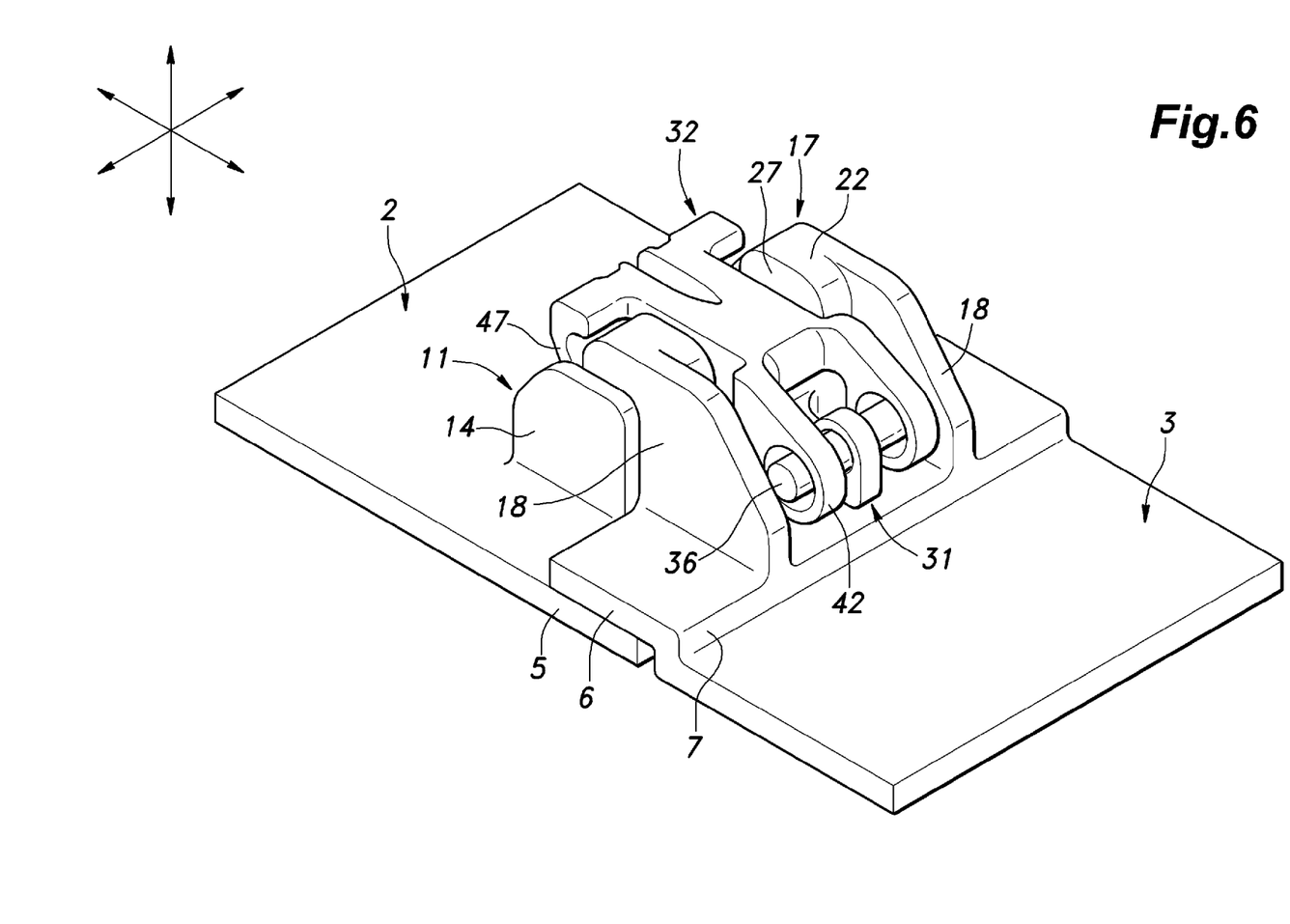
FIG. 6 is a perspective view of the cowling fastening structure of the embodiment.
Figure 7:
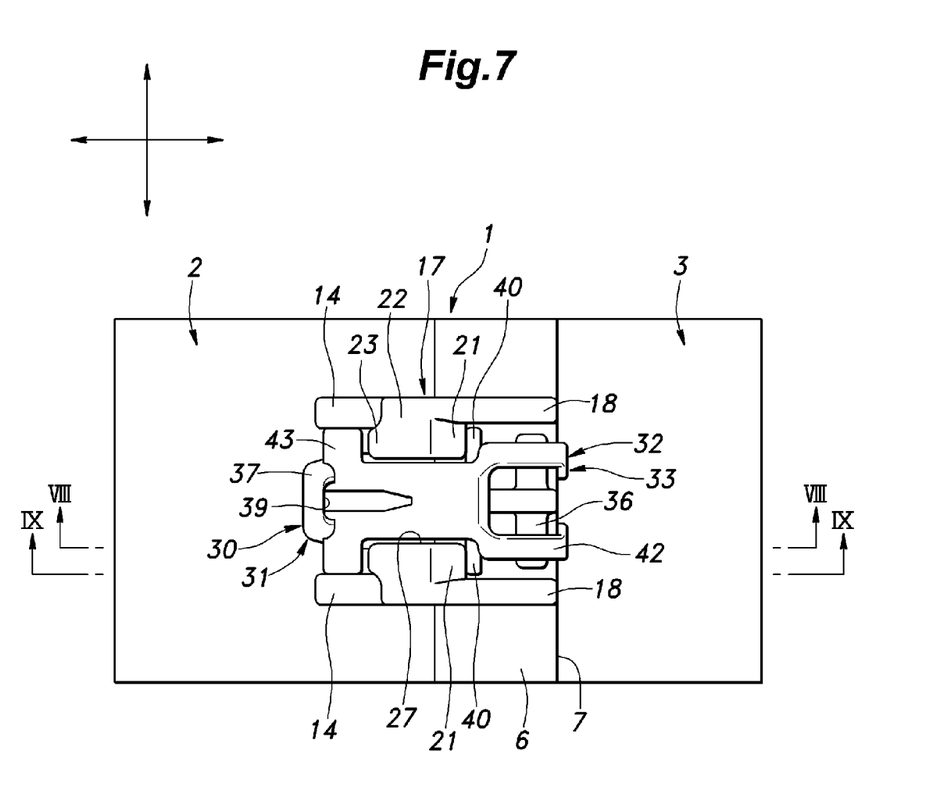
FIG. 7 is a plan view of the cowling fastening structure of the embodiment.
Figure 8:
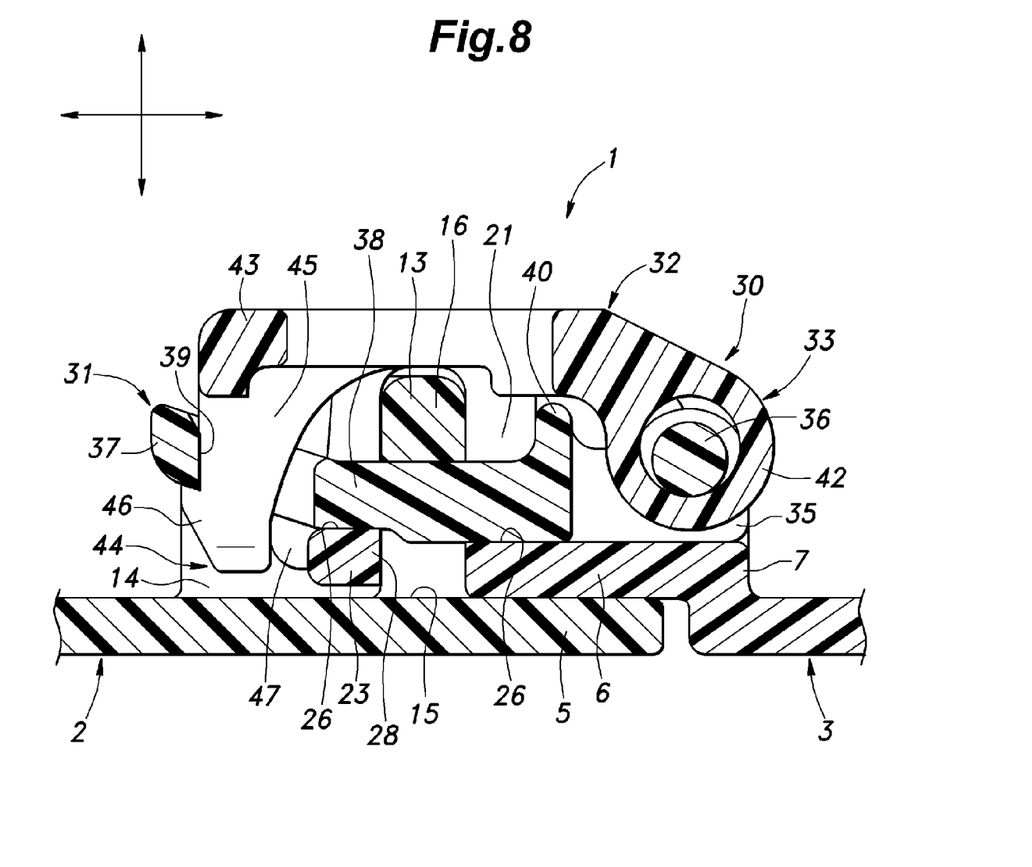
FIG. 8 is a sectional view taken along line VIII-VIII of FIG. 7.

The cowling fastening structure 1 can be formed from the temporarily engaged structure by passing the free end 37 of the first member 31 of the clip 30 into the insertion hole 50 from the side of the second wall base portion 21. As shown in FIG. 5, this inserting movement is completed when the limiting wall 40 of the first member 31 has abutted the second wall base portion 21. In this state, the free end 37 of the first member 31 is passed through the insertion hole 50, and projects outwardly from the second wall free end portion 23. Meanwhile, the engagement hole 39 of the free end 37 protrudes out of the second wall free end portion 23, and is exposed to the outside.

The second member 32 is then turned relative to the first member 31 (see FIG. 5) until the second member 32 straddles the first beam 16 (the first wall 13) from above, and the engagement claw 44 is pushed into the engagement hole 39 for engagement therewith. As a result, the completed cowling fastening structure 1 is achieved as shown in FIGS. 6 to 9.

Figure 9:
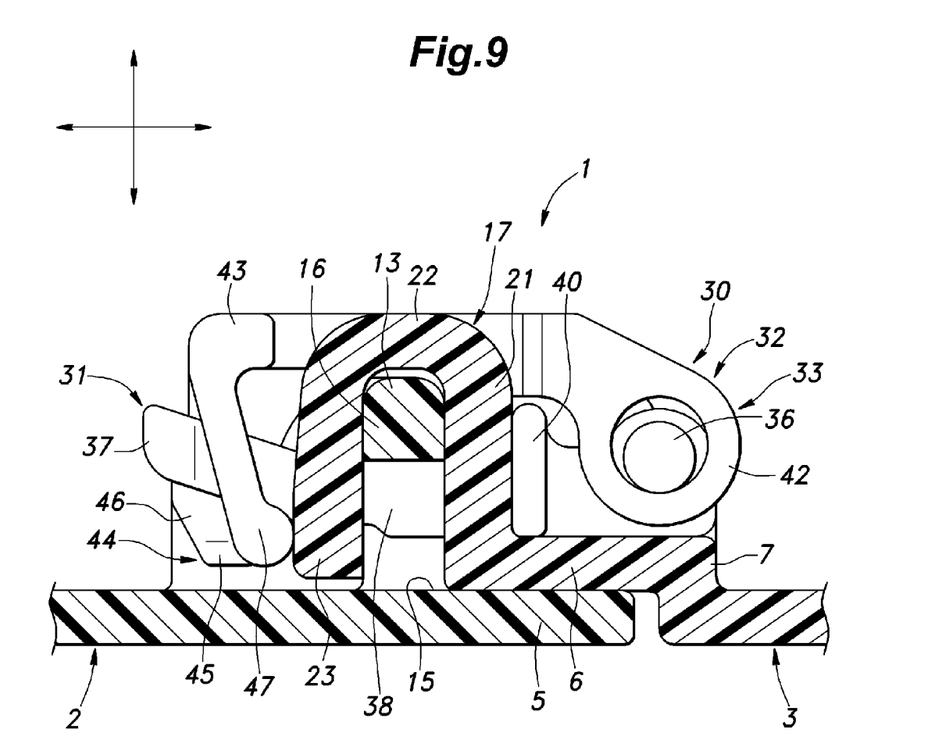
FIG. 9 is a sectional view taken along line IX-IX of FIG. 7.

In the cowling fastening structure 1, a ring structure is formed by the first and second members 31 and 32 as shown in FIG. 9, and the first beam 16 is retained inside this ring structure. As a result, the clip 30 is kept engaged with the first beam 16. Under this condition, the first wall 13 and the hook 17 are prevented from moving relative to each other both in the vertical and lateral directions because the first member 31 is passed into the insertion hole 50. Therefore, the first and second members 31 and 32 are kept engaged with each other. The structural strength of the cowling fastening structure 1 is relatively high because the vertical and lateral relative movements between the first wall 13 and the hook 17 can be positively prevented unless the first member 31 is ruptured. The clip 30 is prevented from coming out of the insertion hole 50 unless the cantilever piece 45 of the engagement claw 44 is ruptured or the engagement hole 39 of the first member 31 is ripped open.

In the cowling fastening structure 1, because a part of the second member 32 is received in the connecting hole 27 (opening 25) of the second wall middle portion 22, the second member 32 does not project upward so that the vertical dimension of the cowling fastening structure 1 can be minimized.

In the cowling fastening structure 1, because the sheet spring pieces 47 engage the outer surface of the second wall free end portion 23 and thereby urge the clip 30 including the second member 32 into the insertion hole 50 of the second wall free end portion 23 in the inserting direction as shown in FIG. 9, the hook 17 is clamped between the sheet spring pieces 47 and the limiting wall 40. As a result, the play between the clip 30 and the hook 17 can be minimized.

Although the present invention has been described in terms of a preferred embodiment thereof, it is obvious to a person skilled in the art that various alterations and modifications are possible without departing from the scope of the present invention. For instance, the connecting hole 27 may be omitted so that the second through hole 26 of the second wall base portion 21 and the second through hole 26 of the second wall free end portion 23 may be formed as separate holes. In this case, the second member 32 may be configured so as to straddle the second wall middle portion 22 from above. The second wall middle portion 22 and the second wall free end portion 23 of the hook 17 may be omitted. In this case, the connecting hole 27 may be omitted so that the second through hole 26 may not communicate with the upper edge of the second wall base portion 21, and the first member 31 may pass through the second through hole 26 of the second wall base portion 21 and the first through hole 15 of the first wall 13. Also, in this case, the sheet spring pieces 47 may engage the first wall 13, and the second wall base portion 21 and the first wall 13 may be clamped between the limiting wall 40 and the sheet spring pieces 47.

Alternatively, the free end 43 of the second member 32 may be formed with an engagement hole while an engagement claw configured to engage this engagement hole is provided in the free end 37 of the first member 31. In this case, the engagement claw may be configured so as to be passed through the insertion hole 50. Also, the first member 31 was passed into the insertion hole 50 from the side of the second wall base portion 21 in the foregoing embodiment, but may also be passed into the insertion hole 50 from the side of the second wall free end portion 23.

The cowling fastening structure 1 of the present invention is useful not only in joining cowling members but also in fastening different parts of automotive components such as garnishes, trims, dashboards and bumpers to one another.

GLOSSARY

| | | | |
|---|---|---|---|
| 1 | cowling fastening structure | 2 | first cowling member |
| 3 | second cowling member | 5 | edge |
| 6 | edge | 11 | first fastening feature |
| 12 | second fastening feature | 13 | first wall |
| 14 | guide wall | 15 | first through hole |
| 16 | first beam | 17 | hook |
| 21 | second wall base portion | 22 | second wall middle portion |
| 23 | second wall free end portion | 25 | opening |
| 26 | second through hole | 27 | connecting hole |
| 28 | second beam | 30 | clip |
| 31 | first member | 32 | second member |
| 33 | hinge | 35 | base end |
| 37 | free end | 39 | engagement hole |
| 40 | limiting wall | 41 | base end |
| 43 | free end | 44 | engagement claw |
| 45 | cantilever piece | 46 | barbed portion |
| 47 | sheet spring piece | 50 | insertion hole |

The invention claimed is:

1. A cowling fastening structure for fastening a first cowling member and a second cowling member to each other by using a clip, comprising:

a first cowling member having a first wall projecting therefrom, the first wall being formed with a first through hole;

a second cowling member having a second wall projecting from an edge of the second cowling member, the second wall being formed with a second through hole; and a clip including a first member and a second member having base ends rotatably connected to each other via a hinge, a free end of one of the first and second members being formed with an engagement hole, and a free end of the other of the first and second members being formed with an engagement claw configured to engage the engagement hole;

wherein the first and second walls are configured to be disposed opposite to each other so that the first and second through holes oppose each other; and wherein the free end of the first member is configured to be passed through the first and second through holes, and the second member is configured to be passed around the first and second walls until the free ends of the first and second members come toward each other and the engagement claw is engaged by the engagement hole.

2. The cowling fastening structure according to claim 1, wherein the engagement hole is formed in the first member as a through hole having an axial line perpendicular to an inserting direction of the first member into the first and second through holes, and the engagement claw is formed in the second member, the engagement claw being configured to be passed through the engagement hole and provided with a barbed portion configured to be engaged by an edge of the engagement hole.

3. The cowling fastening structure according to claim 1, wherein the second wall comprises a second wall base portion projecting from an edge of the second cowling member so as to oppose a surface of the first wall, a second wall middle portion projecting perpendicularly from the second wall base portion so as to extend from a projecting end of the second wall base portion and straddle over a projecting end of the first wall and a second wall free end portion projecting perpendicularly from the second wall middle portion so as to oppose a back side of the first wall, and the second through hole is formed in parts of the second wall base portion and the second wall free end portion corresponding to the first through hole.

4. The cowling fastening structure according to claim 3, wherein the second through hole formed in the second wall base portion and the second through hole formed in the second wall free end portion are connected to each other via a connecting hole extending across the second wall base portion, the second wall middle portion and the second wall free end portion, and a part of the second member is received in the connecting hole when the engagement claw is engaged by the engagement hole.

5. The cowling fastening structure according to claim 3, wherein the first member is provided with a limiting wall that limits an extent of inserting the first member into the first and second through holes by abutting the second wall base portion, and the free end of the second member is formed with a sheet spring piece for engaging the second wall free end portion and resiliently urging the first member in a direction to be inserted into the first and second through holes.

6. The cowling fastening structure according to claim 3, wherein the first cowling member is provided with a guide wall projecting therefrom that is in sliding engagement with the second wall free end portion to restrict a position of the second wall free end portion with respect to the first wall.

7. The cowling fastening structure according to claim 2, wherein the second wall comprises a second wall base portion projecting from an edge of the second cowling member so as to oppose a surface of the first wall, a second wall middle portion projecting perpendicularly from the second wall base portion so as to extend from a projecting end of the second wall base portion and straddle over a projecting end of the first wall and a second wall free end portion projecting perpendicularly from the second wall middle portion so as to oppose a back side of the first wall, and the second through hole is formed in parts of the second wall base portion and the second wall free end portion corresponding to the first through hole.

8. The cowling fastening structure according to claim 4, wherein the first member is provided with a limiting wall that limits an extent of inserting the first member into the first and second through holes by abutting the second wall base portion, and the free end of the second member is formed with a sheet spring piece for engaging the second wall free end portion and resiliently urging the first member in a direction to be inserted into the first and second through holes.

9. The cowling fastening structure according to claim 4, wherein the first cowling member is provided with a guide wall projecting therefrom that is in sliding engagement with the second wall free end portion to restrict a position of the second wall free end portion with respect to the first wall.

10. The cowling fastening structure according to claim 5, wherein the first cowling member is provided with a guide wall projecting therefrom that is in sliding engagement with the second wall free end portion to restrict a position of the second wall free end portion with respect to the first wall.

* * * * *